United States Patent Office 3,518,287
Patented June 30, 1970

3,518,287
METAL OXIDE ACYLATES AND THEIR PROCESS OF PREPARATION
Jacobus Rinse, 77 Anderson Road, Bernardsville, N.J. 07924
No Drawing. Filed July 5, 1967, Ser. No. 651,120
Int. Cl. C07f 11/00, 15/02, 7/94
U.S. Cl. 260—438.5                                    10 Claims

ABSTRACT OF THE DISCLOSURE

Organic metal compounds containing a high percentage of metal and having a central molecular structure comprising two or three metal atoms connected by oxygen bonds to each other, at least one of the metals being trivalent, and, in turn, connected to two or three acyloxy groups or to three divalent-metal acyloxy groups are prepared by reacting metal acetates or formates with metal oxides or hydroxides and with an aliphatic acid having from 7-22 carbon atoms or with a divalent metal acyl oxide of such acid to form products useful as resin additives, fungicides, anti-corrosives and colorants.

BACKGROUND OF THE INVENTION

Polyacylated aluminum oxide structures are known which are capable of forming cyclic oligomers, such as the triacylated cyclic aluminum oxide trimers disclosed in U.S. Pat. 2,979,497. Products of this character may be prepared, for example, by reacting an aluminum alkoxide with an aliphatic monocarboxylic acid, particularly a long chain acid.

The cyclic aluminum acylate oxide trimers have been useful principally as thickeners for resins, oils, asphalt, and the like.

In British Pat. 972,804 there are disclosed metal organic compounds containing aluminum, in which the aluminum atom is linked through oxygen to a divalent metal which is in turn connected to a carboxylic acid radical, but in such structures, the remaining aluminum bonds are connected to other aluminum atoms via oxygen atoms, and not to additional divalent metal atoms. Metal organic compounds of this type are obtained by condensing alkoxides or aryloxides of aluminum with acyloxides of divalent metals. The resulting compounds are said to be useful as stabilizers for polyvinyl chloride resins.

Experience has shown the desirability of extending the principle of metal oxide acylates to trivalent metals other than aluminum and of combining such trivalent metals with divalent metals. To accomplish these objectives, it was necessary to devise new and more efficient methods for the preparation of the organic metal compounds.

SUMMARY OF THE INVENTION

In accordance with an important aspect of the present invention there are provided novel organic metal compounds containing a high percentage of metal, and having a central molecular structure comprising three atoms of a trivalent metal, connected by oxygen bonds to each other and by oxygen bonds to (1) three acyl groups or (2) three divalent metal acyloxy groups. In accordance with another aspect of the invention there is provided a novel method for the preparation of the aforementioned organic metal compounds, which is simple and direct, and permits the utilization of low cost raw materials.

For ease of illustration, generally speaking, M is used to represent a trivalent metal, M' to represent a divalent metal, and X to represent an acyloxy radical containing more carbon atoms than an acyloxy radical represented by X'.

A class of novel organic metal compounds according to the invention is that represented by the formula:

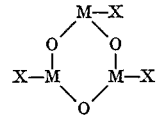

wherein M represents a trivalent metal selected from the group consisting of iron, chromium, bismuth, and cerium, and X is an acyloxy radical derived from a monocarboxylic acid having at least 7 carbon atoms, and preferably having at least 10 to 22 carbon atoms.

These compounds may be regarded as cyclic oligomers of trivalent metal oxide acylates, specifically the trimers. Typically these organic metal compounds, and the compounds discussed below, are useful as anti-corrosives and for incorporation with alkyd and other resins in the improvement and coloring of coating compositions. Due to the inherent color of the novel products hereof, they may be considered permanent colorants. The formula for such compounds may be written as $(OMX)_3$.

Another class of novel compounds according to the invention is that represented by the formula:

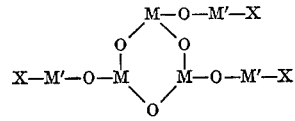

wherein M is a trivalent metal, such as aluminum, iron, chromium, bismuth, and cerium, X is an acyloxy radical derived from a monocarboxylic acid having, for instance, from 7 to 22 carbon atoms, preferably at least 10 carbon atoms, and M' is a divalent metal, such as, for example, zinc, lead, magnesium, calcium, cadmium, copper, nickel, cobalt and manganese.

The formula for such compound may be written $(OMOM'X)_3$.

Still another class of metal-rich organic metal compounds producible by the process hereof may be represented by the formula:

(a)         XM'OM(X')OM'X
(b)         XM'OM(X)OM'X
(c)         XM'OM(OH)OM'X
(d)            M(OM'X)_3 wherein M, M' and X are the same as defined above and X' is a lower molecular acyloxy radical.

The monocarboxylic acids suitable for preparing the foregoing classes of organic metal compounds of the invention may be of any type including aliphatic, either saturated or unsaturated, aromatic, cycloaliphatic, and heterocyclic acids. The aliphatic acids are preferred, and these may be linear or branched, or with a neo-structure, i.e., one in which the carbon atom in alpha-position to the carboxyl group is a quaternary carbon atom. Fatty acids, such as stearic, palmitic and oleic acid are suitable, as are also such acids as linoleic and tall acid mixtures. Acids with less than seven carbon atoms are less suitable, because of their volatility. Instead of a single acid, mixtures of two or more acids may be employed.

Regarded from the standpoint of their molecular structure, the new organic metal compounds are derivatives of trivalent metals or trivalent and divalent metals in which each metal atom is connected to another metal atom by an oxygen atom. This group of metal and oxygen atoms serves as the center of the molecule, while acyl groups, one per metal atom, surround the center.

As the formula above clearly demonstrates the compounds hereof contain one, or less, acyl groups per metal atom. This structure differs from that of conventional metal soaps where two or three ligands are attached to each metal atom, i.e., the metals to acyl, or acyloxy ratio is 1:2 or 1:3. Thus the new compounds of the invention are very stable and their properties are quite different from those of metal soaps.

For instance, it will be apparent from the foregoing illustrative formula the organic polyvalent metal compounds hereof typically have a metal to acyl, or acyloxy, ratio of, respectively, 1:1; 2:1; 1:1; 3:2 and 4:3 or at least twice the metal content of metal soaps.

In general, the metal organic compounds of the invention are easily soluble in hydrocarbon solvents to form low viscosity clear solutions. Where fatty acids of at least 7 carbon atoms are employed, and depending upon the type of acid, the compounds are oils or soft or hard waxes or resinous products. Certain of the compounds hereof may be likened to fats and oils in which the glyceride radical is replaced by a group of metal and oxygen atoms. By using polyunsaturated fatty acids, the solutions of the products dry in a manner similar to that of a drying oil, to form insoluble coatings of high clarity and gloss. As illustrated above, their metal contents are considerably higher than coating derived from regular metal soaps, and the latter, moreover, do not dry to gloss films.

The metals used determine the color of the products. Thus, aluminum oxide trimers and aluminum-zinc oxide acylates are practically colorless or light brown. Iron derivates exhibit a deep brown to reddish brown color with many gradations. Chromium derivatives are green, as are copper and nickel oxide acylates, while manganese yields a middle brown shade, and cobalt a violet-blue resin. Cyclic oligomers of iron and chromium have an intense color, probably owing to the presence of three or more trivalent metal atoms in the molecule.

In addition to the uses mentioned previously, the new metal oxide acylates can serve as acid binders (aluminum-zinc compounds), as varnish stains, tinting colors for white paints, wood preservatives, antifouling agents, corrosion inhibitors, leather waxes, stabilizers, and additives for rubber compounding.

The class of cyclic oligomers of trivalent metal oxide acylates disclosed above is prepared, in accordance with the invention, by a novel method which involves reacting a trivalent metal salt of a lower aliphatic carboxylic acid, such as a formate or an acetate, usually in the presence of a small amount of water, with the equivalent quantity of a monocarboxylic acid which is less volatile than the acid of the trivalent metal salt, at a temperature above about 200° C. until the reaction is complete, and removing volatile lower aliphatic carboxylic acid liberated, under vacuum.

Where aluminum is the trivalent metal, the products thus obtained are identical with those prepared by known methods by reacting an aluminum alkoxide with a fatty acid.

Thus, cyclic trivalent iron oxide acylates may be prepared by substituting one acetate group of basic iron diacetate with any acyl group of at least 7 carbon atoms, followed by condensation at 200°–250° C. in vacuum to remove liberated acetic acid. Formates may also be used in this reaction.

Similarly, cyclic trivalent chromium oxide acylates may be prepared by volatilizing one acetate or formate group with steam generated by the water present, with replacement thereof by a less volatile acyl group, and condensing this intermediate product to a cyclic chromium oxide acylate.

Derivatives of cerium, bismuth, and the like may be similarly prepared.

The cyclicizing reactions just described are believed to proceed in two steps (a) condensation by formation of oxygen bonds between trivalent metal atoms, and (b) substitution of lower acyl groups, such as formate or acetate groups, by a less volatile acyl group. It is preferable for the condensation to precede the substitution, but this is not always possible owing to the insolubility of the condensed acetate. Therefore, substitution may proceed, whether fully or partially, simultaneously with the condensation.

In some cases, for example using chromium triacetate, substitution precedes and is followed by steam distillation to remove two acetate groups. Subsequent heating to 200° C. causes the condensation to proceed. Thus, the basic acetates of iron and aluminum are particularly suited for this procedure, since they contain only two acyl groups, one to be substituted, and the other to react with the hydroxyl group on another metal atom.

The compounds of the invention in which both trivalent and divalent metals are present may be prepared by a similar reaction whereby a trivalent metal salt of a lower aliphatic carboxylic acid, such as a formate or an acetate, is heated with an oxide or a hydroxide of a divalent metal, in the presence of water, and then the relatively nonvolatile monocarboxylic acid is added to the mixture. Upon distillation, the volatile formic or acetic acid is liberated, and is removed under vacuum with excess water and with the solvent, where a solvent is employed. The vacuum typically is less than about 2 cm. Hg, and the temperature may be of the order of 250°–300° C. The formic or acetic acid and solvent may be reused. The reaction proceeds with remarkable facility, and frequently a heat effect may be noticed, indicating that the condensation product of two or more metal atoms has formed a more stable configuration. Thus, hydroxy-metal diacylates of trivalent metals, if exposed to temperatures above 200° C. in vacuum, have been found to condense easily to form cyclic metal oxide acylates.

Also, in some cases, it is possible to use a trivalent metal-hydroxide (e.g., aluminumhydroxide) with a divalent metal-acetate. They condense to the same structures as divalent metal oxides (or hydroxides) with trivalent metal acetates (Examples 7 and 11).

In all the foregoing reactions, the practical upper limit of temperature depends upon the reactants, but is usually about 250°–300° C.

Where a solvent is employed it may be, for example, a hydrocarbon type, such as mineral spirits. Antifoaming agents such as butanol may also be added where needed.

Summarizing, it is seen the present process from a functional basis achieves two effects, namely, greatly increasing the metal to acyl, or acyloxy, ratio and, at the same time, introducing higher molecular acyl groups. Theoretically the less volatile acid can always be induced to replace the more volatile acid but for practical and economic reasons, the organic acid salts of the trivalent metals normally used are the formates or the acetates and the less volatile acid is one containing at least 7 carbon atoms. Obviously the substituting acid must contain at least 2 carbon atoms where formate is used and 3 carbon atoms where the acetate is used, but preferably contains at least 7 carbons for the substitution with radicals derived therefrom are more easily controlled and the resulting organic metal-rich compounds derived therefrom have great commercial interest.

While applicant does not wish to be bound by any theoretical considerations, it does appear the various types of substitution, or condensation and substitution, reactions may be visualized as set out below in represensitive equations in which M, M′, X, and X′ have the significance set out before.

(1) $3M(X')_3 + 3HX + 3H_2O \rightarrow (OMX)_3 + 9HX$ (2) $3HOM(X')_2 + 3HX \rightarrow (OMX)_3 + 6HX'$ (3) $3M(X')_3 + 3HX + 3M'O + 3H_2O \rightarrow (ONOM'X)_3 + 9HX'$ (4) $3HOM(X')_2 + 3HX + 3M'O \rightarrow (OMOM'X)_3 + 6HX'$ (5) $M(X')_3 + 2HX + 2M'O \rightarrow XM'OM(X')OM'X + 2HX'$ (6) $HOM(X')_2 + 2HX + 2M'O \rightarrow XM'OM(X')OM'X + H_2O + HX'$ (7) $HOM(X')_2 + 3HX + 2M'O \rightarrow XM'OM(X)OM'X + H_2O + 2HX'$ (8) $M(X')_3 + 3HX + 3M'O \rightarrow M(OM'X)_3 + 3HX'$ (9) $M(X')_3 + 3HX + 3M')OH)_2 \rightarrow M(OM'X)_3 + 3HX' + 3H_2O$

(10) $HOM(X')_2 + 3HX + 3M'O \rightarrow M(OM'X)_3 + 2HX' + H_2O$

(11) $HOM(X')_2 + 2HX + 2M'O \rightarrow XM'OM(OH)OM'X + 2HX'$ (Equation 9 illustrates the use of a divalent metal hydroxide in place of a divalent metal oxide.)

The foregoing illustrations make it clear that water is not needed in all of the reactions hereof but water usually is present for it acts as a solvent and facilitates the condensation reaction. An excess of water does not hinder the reaction but small quantities normally are used to avoid the necessity of vaporizing off excesses thereof when dry reaction products are desired.

It will be observed, also, from the equations set out above that all divalent metals react in the same manner so that it is not necessary to use a single metal for one can use, for example, mixtures of lead and zinc or nickel and manganese. Likewise more than one trivalent metal may be used provided the appropriate molar ratios of reactants are used to obtain the desired type or types of compound with the desired molecular orientation.

As to the ratio of trivalent, and divalent metals, the foregoing equations illustrate the ratio of divalent metals to trivalent metals (when both are used) is 1:1; 2:1; or 3:1 when compounds of highest purity are desired. Nevertheless, since the principles of the reaction have been established as set out above, it is clear the ratio of divalent metals to trivalent metals may vary anywhere between 1:1 and 3:1.

Among other things, it will be apparent the process hereof enables one to produce organic trivalent-divalent metal acyloxy compounds having a metal to acyloxy ratio of at least 1:1 in which the trivalent metal is connected through an oxygen atom to at least two other di- or trivalent metal acyloxy groups containing at least 7 carbon atoms and any remaining valency on the trivalent metal is satisfied with an acyloxy group or an OH group.

The following examples illustrate the practice of the invention, but are not to be regarded as limiting. The formula for the type of compound produced will be set out as in the equations above.

EXAMPLE 1

19.1 grams basic ferric acetate, $HOFe(OOCH_3)_2$, is mixed with 16.2 grams zinc oxide and 20 grams of mineral spirits. After heating for 10 minutes at 100° C., 56 grams tall oil fatty acids is added and water is distilled off. The color darkens gradually. At 150° C. 30 grams mineral spirits is added and the temperature is raised to 200° C., whereupon vacuum is applied. The reaction is completed when boiling ends. The product (84 grams) solidifies at 60° C. and is clearly soluble in mineral spirits. The iron content is 6.64% (theory 6.68%). Upon addition of 0.5% cobalt drier the solution dries in 90 minutes to a clear, high gloss coating.

This compound is representative of the formula $XM'OM(X')OM'X$.

EXAMPLE 2

38.2 grams basic ferric acetate is mixed with 40 grams of mineral spirits and heated to 100° C., whereupon 53 grams technical stearic acid is added. Then the temperature is raised to 250° C., finally applying vacuum. The product (67.0 grams, theory 67.2 grams) is a hard, dark brown solid M.P. 90° C., soluble in mineral spirits. When mixed with titanium oxide stearate a highly water-repellant shoe polish is obtained.

This compound is representative of the formula $(OMX)_3$.

EXAMPLE 3

The same procedure as in Example 1 is followed but the quantity of tall oil fatty acid is increased to 84 grams and 100 cc. butanol is added to avoid foaming. The yield is 106.5 grams (theory 105.6 grams) of a dark brown solid, which dissolves easily in mineral spirits and is usable as a varnish stain for wood.

This compound is representative of the formula $XM'OM(X)OM'X$.

EXAMPLE 4

The same procedure is followed as in Example 1 but using 8.1 grams zinc oxide. Yield 75.4 grams (theory 75.4 grams).

The compound may be represented by the formula $XM'OM(X')X$.

EXAMPLE 5

24.7 grams crystalline chromium triacetate is mixed with 16.2 grams zinc oxide and 80 grams water is added. After heating 30 minutes at 100° C., the color has changed to dark green, 56 grams tall oil fatty acids is added and 45 grams mineral spirits. Vacuum is applied at 220° C. The clear green product dissolves in 40 parts mineral spirits. It dries with 0.5% cobalt drier to a high gloss clear coating.

The compound may be represented by the formula $XM'OM(X')OMX$.

EXAMPLE 6

14.8 grams aluminum acetate-formate,

$HCOOAl(OH)OOCCH_3$ is heated together with 16.2 grams zinc oxide and 50 grams water. After 5 grams water has been distilled off, 53 grams stearic acid and 30 grams mineral spirits is added. At 180° C. the batch becomes clear. Vacuum is applied at 200° C. Yield 72.0 grams of a hard wax (theory 71.7 grams), which may be used as a rubber compounding additive.

The compound may be represented by the formula $XM'OM(OH)OM'X$ or

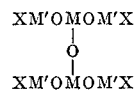

EXAMPLE 7

24.5 grams crystalline manganese acetate is heated with 7.8 grams freshly prepared aluminum hydroxide and 60 grams mineral spirits. At 130° C. 28 grams stearic acid is added and at 175° C., 14 grams stearic acid. Also 50 grams hydrocarbon solvent Isopar M. The batch becomes clear at 200° C. and gradually liquifies at 230° C. After cooling to 100° C., 5 grams water is added and temperature raised to 200° C. with vacuum at the end. Yield 51.7 grams of a dark brown solid wax (theory 50.3 grams) which is soluble in butanol and in mineral spirits.

The compound may be represented by the formula XM′OM(X)OM′X.

EXAMPLE 8

22 grams crystalline zinc acetate is heated with 7.8 grams aluminum hydroxide and 5 grams water. At 130° C., 28 grams tall oil fatty acids are added and at 180° C., 14 grams of same. Vacuum is applied and after cooling to 100° C., 10 grams water is added. The batch is heated to 200° C. and distilled off in vacuum to yield 53.5 grams of a clear oil which dries to a clear film after addition of 0.5 cobalt drier.

The compound may be represented by the formula XM′OM(X)OM′X.

EXAMPLE 9

The same procedure is followed as in Example 6 but zinc oxide is replaced by 11.6 grams magnesium hydroxide. Yield 69.0 grams of a hard solid melting at 150° C. Theoretic yield 68.5 grams.

The compound may be represented b ythe formula XM′OM(OH)OM′X.

EXAMPLE 10

7.2 grams aluminum acetate-formate is heated with 14 grams isostearic acid and 20 grams mineral spirits to 180° C., and finally to 220° C. under vacuum. The batch becomes liquid. Yield 15.5 grams of a wax-like product, which reacts with organic acids or with water to yield aluminum mono- and di-soaps. It is identical with a product prepared from aluminum isopropoxide, isostearic acid and water.

The compound may be represented by the formula $(OMX)_3$.

EXAMPLE 11

22 grams zinc acetate ($2H_2O$) is heated with 2.6 grams aluminum hydroxide, 5 grams water and 50 grams mineral spirits. 28 grams tall oil fatty acids are added at 130° C. and the batch is distilled off at 220° C., finally applying vacuum. The product yield of 38 grams corresponds with the calculated one of 37 grams for $(TZnO)_3Al$, T being tallate.

EXAMPLE 12

9.5 grams basic iron acetate and 33.5 grams lead oxide are heated with 35 grams water to 100° C. and kept there for 5–10 minutes. Then 42 grams isostearic acid is added and distillation continued. Gradually 40 grams mineral spirits is added and temperature raised to 200° C. where vacuum is applied. Here acetic acid is slowly developed and distilled off, leaving 79.4 grams of a dark brown liquid which solidifies at 80° C. Expected yield for $(XPbO)_3Fe$ 81.0 grams.

EXAMPLE 13

24.7 grams chromium acetate is heated with 15 grams butanol and 35 grams water. During distillation there is added 30 grams butanol, 20 grams xylene and 28 grams isostearic acid. When temperature rises to 160° C., 20 grams Isopar M hydrocarbon solvent is added and steam distillation is applied shortly. Finally temperature is raised to 240° C., where acetic acid develops and is removed by vacuum. Yield is 34.9 grams (theory 34.7 grams) of $(OCrX)_n$ cyclic chromium oxide isostearate, which is a solid with melting point above 150° C. and soluble in xylene to a clear, bright, intense green color.

EXAMPLE 14

38 grams ferric acetate is heated with 26 grams neoheptanoic acid in presence of 30 grams hydrocarbon solvent Isopar M to 240° C. and finally put under 2 cm. vacuum until distillation terminates. The dark black liquid solidifies at 190° C. and is soluble in a hydrocarbon-butanol mixture. The yield is 40.5 grams (theory 40.2 grams) for cyclic iron oxide heptanoate. Iron content is 27.7%.

EXAMPLE 15

19.1 grams basic ferric diacetate and 29.5 grams methyl linoleate are heated in presence of 10 grams mineral spirits to 240° C. and kept there for 60 minutes until foam formation ends. Vacuum is applied and the residue is a clear brown liquid, yield 55.5 grams (theory 55.1 grams), which dries to a tack-free clear coating upon addition of 0.1% cobalt naphthenate.

EXAMPLE 16

10.0 grams chromic acid is dissolved in 12.0 grams acetic acid and 5.0 grams water. Then 13.0 grams zinc dust is added. A reaction proceeds changing the orange yellow into a bright green. Finally 84 grams tall oil fatty acid is added and the batch heated under vacuum until substitution is completed. The solution in mineral spirits may be used as a preservative stain for wood.

EXAMPLE 17

19.7 grams potassium permanganate is dissolved in water, 13 grams zinc dust and 112 grams stearic acid is added and heat applied. The reduction reaction proceeds easily and is followed by condensation and soap formation. The clear brown product, containing sodium stearate, is easily emulsifiable.

In the preceding examples, the subatmospheric pressures used varied between about 2 and 30 mm. Hg. In general, a subatmospheric pressure of 20 mm. Hg and lower are required.

What is claimed is:

1. Organic metal compounds having the formula:

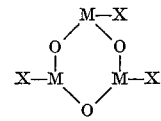

wherein M is a trivalent metal selected from the group consisting of iron, chromium, bismuth, and cerium, and X is an acyloxy derived from a monocarboxylic acid having from 7 to 22 carbon atoms.

2. The compounds of claim 1 in which the trivalent metal is iron.

3. The compound of claim 1 in which the trivalent metal is chromium.

4. Method for the preparation of organic metal compounds which comprises reacting in a molar ratio of approximately 1:1 a trivalent metal salt of a lower aliphatic carboxylic acid with a monocarboxylic acid having from 7 to 22 carbon atoms in the presence of water at a temperature above about 200° C., and removing the lower aliphatic carboxylic acid liberated in the reaction said lower carboxylic acid being more volatile than said monocarboxylic acid.

5. The method of claim 4 in which the lower aliphatic carboxylic acid is acetic acid.

6. The method of claim 4 in which the trivalent metal is iron.

7. The method of claim 4 in which the reaction is performed under vacuum.

8. The method of claim 4 in which the trivalent metal salt is a basic salt and the reaction is carried out in the absence of water.

9. Method for the preparation of a cyclic trivalent iron oxide acylate comprising reacting in a molar ratio of approximately 1:1 a basic trivalent iron diacetate with a monocarboxylic acid having at least 7 carbon atoms at a temperature between about 200° and 250° C. and removing the liberated acetic acid under vacuum.

10. A method according to claim 4 for the preparation of an organic metal compound which comprises reacting in a molar ratio of approximately 1:1, in the presence of water, a trivalent metal salt of a lower aliphatic carboxylic acid with a monocarboxylic acid having from 7 to 22 carbon atoms at a temperature above about 200° C. and removing the lower aliphatic carboxylic acid liberated in the reaction said lower carboxylic acid being more volatile than said monocarboxylic acid, the trivalent metal being a member selected from the group consisting of aluminum, iron, chromium, bismuth and cerium.

References Cited

UNITED STATES PATENTS

| | | | |
|---|---|---|---|
| 3,054,816 | 9/1962 | Rinse | 260—448 |
| 3,296,242 | 1/1967 | Turner et al. | 260—105 |

FOREIGN PATENTS 825,878  12/1959  Great Britain.

OTHER REFERENCES

Rinse: Industrial and Engineering Chemistry, 1964, vol. 56, pp. 42, 44–45.

TOBIAS E. LEVOW, Primary Examiner

A. P. DEMERS, Assistant Examiner

U.S. Cl. X.R.

106—219, 288, 292, 297, 301, 302, 304, 8; 252—35, 389, 400; 260—97.5, 414, 429.2, 429.9, 429, 438.1, 439, 435, 447, 448